United States Patent
Solhusvik et al.

(10) Patent No.: US 8,860,817 B2
(45) Date of Patent: Oct. 14, 2014

(54) IMAGING SYSTEMS WITH VERIFICATION CIRCUITRY FOR MONITORING STANDBY LEAKAGE CURRENT LEVELS

(75) Inventors: Johannes Solhusvik, Haslum (NO); Steffen Skaug, Oslo (NO)

(73) Assignee: Aptina Imaging Corporation, George Town (KY)

( * ) Notice: Subject to any disclaimer, the term of this patent is extended or adjusted under 35 U.S.C. 154(b) by 176 days.

(21) Appl. No.: 13/399,933

(22) Filed: Feb. 17, 2012

(65) Prior Publication Data

US 2013/0027566 A1 Jan. 31, 2013

Related U.S. Application Data

(60) Provisional application No. 61/511,465, filed on Jul. 25, 2011.

(51) Int. Cl.
| | | |
|---|---|---|
| *H04N 17/00* | (2006.01) | |
| *H04N 9/64* | (2006.01) | |
| *H04N 1/00* | (2006.01) | |
| *H04N 1/195* | (2006.01) | |
| *H04N 5/232* | (2006.01) | |

(52) U.S. Cl.
CPC ....... *H04N 1/00021* (2013.01); *H04N 1/00063* (2013.01); *H04N 1/00053* (2013.01); *H04N 1/195* (2013.01); *H04N 1/00031* (2013.01); *H04N 1/00034* (2013.01); *H04N 5/23241* (2013.01); *H04N 1/00074* (2013.01)
USPC .......................................... 348/187; 348/243

(58) Field of Classification Search
USPC ................... 348/187, 72, 294, 243; 714/745; 324/762.01; 702/60, 64, 81, 116
See application file for complete search history.

(56) References Cited

U.S. PATENT DOCUMENTS

| | | | |
|---|---|---|---|
| 5,760,599 A | 6/1998 | Ehiro | |
| 5,767,659 A * | 6/1998 | Farley | 320/106 |
| 6,011,403 A | 1/2000 | Gillette | |
| 6,255,839 B1 | 7/2001 | Hashimoto | |
| 6,469,289 B1 | 10/2002 | Scott-Thomas et al. | |
| 6,731,564 B1 * | 5/2004 | Tran et al. | 365/229 |
| 6,885,210 B1 | 4/2005 | Suzuki | |
| 7,414,409 B1 * | 8/2008 | Faifer et al. | 324/522 |
| 7,501,848 B2 | 3/2009 | Kim | |

(Continued)

FOREIGN PATENT DOCUMENTS

| | | |
|---|---|---|
| WO | 2007049331 | 5/2007 |
| WO | 2008044183 | 4/2008 |
| WO | 2010073624 | 7/2010 |

*Primary Examiner* — Victor Kostak
(74) *Attorney, Agent, or Firm* — Treyz Law Group; Kendall P. Woodruff

(57) ABSTRACT

Imaging systems may be provided with image sensors having verification circuitry. Verification circuitry may be configured to continuously or occasionally verify that the image sensor is functioning properly. For example, verification circuitry may be configured to monitor levels of leakage current during standby mode. Verification circuitry may be coupled between a power supply and circuitry that is powered by that power supply. When the imaging system is in standby mode, circuitry associated with the imaging system such as pixel circuitry may draw a standby leakage current. Verification circuitry may be configured to measure the amount of standby leakage current drawn by associated imaging system circuitry. If the measured level of standby leakage current exceeds a maximum acceptable level of standby leakage current, a warning signal may be generated. Standby leakage current levels on multiple power supply lines may be monitored with associated verification circuitry.

20 Claims, 3 Drawing Sheets

(56) References Cited

U.S. PATENT DOCUMENTS

| | | |
|---|---|---|
| 2001/0052777 A1 | 12/2001 | Belau et al. |
| 2006/0081770 A1* | 4/2006 | Buchin .................. 250/214 VT |
| 2007/0268022 A1 | 11/2007 | Nagata |
| 2008/0129219 A1* | 6/2008 | Smith et al. .................. 315/291 |
| 2008/0136505 A1* | 6/2008 | Valentian ..................... 327/543 |
| 2008/0143184 A1 | 6/2008 | Otsuga et al. |
| 2009/0021411 A1* | 1/2009 | Maruyama ..................... 341/155 |
| 2009/0058484 A1* | 3/2009 | Rao et al. ..................... 327/202 |
| 2009/0322367 A1 | 12/2009 | Priel et al. |
| 2010/0007327 A1 | 1/2010 | Andoh et al. |
| 2011/0260747 A1 | 10/2011 | Kameda et al. |

* cited by examiner

IMAGING SYSTEMS WITH VERIFICATION CIRCUITRY FOR MONITORING STANDBY LEAKAGE CURRENT LEVELS

This application claims the benefit of provisional patent application No. 61/511,465, filed Jul. 25, 2011, which is hereby incorporated by reference herein in its entirety.

BACKGROUND

This relates generally to imaging devices, and more particularly, to imaging devices with verification circuitry.

Electronic devices such as cellular telephones, cameras, and computers often use digital image sensors to capture images. Image sensors may be formed from a two-dimensional array of image pixels that convert incident photons (light) into electrical signals.

Over the lifetime of an electronic device, the image sensor in the electronic device may be prone to failure. For example, integrated circuit components in an image sensor may break down over time, which in turn may lead to an increase in leakage current levels during standby mode. A high level of leakage current during standby mode may cause functional failure in an image sensor or may otherwise indicate that the reliability of integrated circuit components in the image sensor has been compromised.

Conventional image sensors are often tested during manufacturing to verify that the components of the image sensor are operating properly. However, many failure mechanisms and functional issues (e.g., high current leakage) occur after the image sensor has been in use for some time.

It would therefore be desirable to be able to provide improved imaging systems with system verification capabilities.

DETAILED DESCRIPTION

Figure 1:
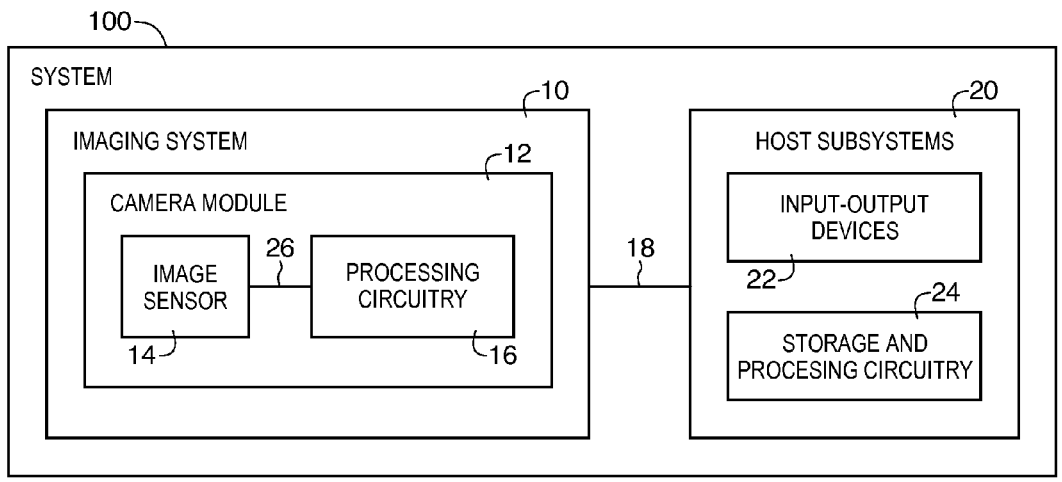
FIG. 1 is a diagram of an illustrative system that includes an imaging system and a host subsystem in accordance with an embodiment of the present invention.

Imaging systems having digital camera modules are widely used in electronic devices such as digital cameras, computers, cellular telephones, and other electronic devices. A digital camera module may include one or more image sensors that gather incoming light to capture an image.

In some situations, imaging systems may form a portion of a larger system such as a surveillance system or a safety system for a vehicle (e.g., an automobile, a bus, or any other vehicle). In a vehicle safety system, images captured by the imaging system may be used by the vehicle safety system to determine environmental conditions surrounding the vehicle. As examples, vehicle safety systems may include systems such as a parking assistance system, an automatic or semi-automatic cruise control system, an auto-braking system, a collision avoidance system, a lane keeping system (sometimes referred to as a lane drift avoidance system), etc. In at least some instances, an imaging system may form part of a semi-autonomous or autonomous self-driving vehicle. Such imaging systems may capture images and detect nearby vehicles using those images. If a nearby vehicle is detected in an image, the vehicle safety system may sometimes operate a warning light, a warning alarm, or may operate active braking, active steering, or other active collision avoidance measures. A vehicle safety system may use continuously captured images from an imaging system having a digital camera module to help avoid collisions with objects (e.g., other automobiles or other environmental objects), to help avoid unintended drifting (e.g., crossing lane markers) or to otherwise assist in the safe operation of a vehicle during any normal operation mode of the vehicle.

Vehicle safety standards may require that the proper operation of any component of a vehicle safety system (including imaging system components) be verified before, during, and/or after operation of the vehicle. Verification operations for imaging system components may be performed by an imaging system prior to and/or after operation of a vehicle (e.g., upon startup and/or shutdown of the imaging system). In some situations, verification operations may be performed concurrently with operation of the imaging system. In other situations, it may be desirable to perform verification operations during standby mode. For example, it may be desirable to monitor leakage current levels in circuitry such as imaging system circuitry during standby mode. High levels of leakage current during standby mode may indicate possible deterioration (e.g., damage) of integrated circuit components in the circuitry. Imaging systems may be provided having self-verification capabilities such as capabilities to monitor standby leakage current levels.

An image sensor may include an array of image pixels. The pixels in the image sensor may include photosensitive elements such as photodiodes that convert the incoming light into electric charge. An image sensor may have any number of pixels (e.g., hundreds or thousands or more). A typical image sensor may, for example, have hundreds, thousands, or millions of pixels (e.g., megapixels). An image sensor may include verification circuitry for monitoring leakage current and/or verifying the correct operation of the image sensor. For example, verification circuitry in the image sensor may be configured to measure leakage current during standby mode and to compare the measured leakage current value with a predetermined threshold value.

Based on the result of the comparison of the measured leakage current level with the predetermined threshold level, an imaging system may be disabled (e.g., if the level of leakage current exceeds the threshold level), or may continue to operate normally (e.g., if the level of leakage current is below the threshold level). In some arrangements, the imaging system may remain in operation but an indicator may be presented to a user to inform the user that the imaging system needs further inspection and/or repair (e.g., the imaging system may present a "check imaging system" indication when the results of verification operations indicate a potential problem in the operation of the imaging system).

FIG. 1 is a diagram of an illustrative imaging and response system including an imaging system that uses an image sensor to capture images. System 100 of FIG. 1 may be a vehicle safety system (e.g., an active braking system or other vehicle safety system), may be a surveillance system, or may be an electronic device such as a camera, a cellular telephone, a video camera, or other electronic device that captures digital image data.

As shown in FIG. 1, system 100 may include an imaging system such as imaging system 10 and host subsystems such as host subsystem 20. Imaging system 10 may include camera module 12. Camera module 12 may include one or more image sensors 14 and one or more lenses. The lenses in camera module 12 may, as an example, include M*N individual lenses arranged in an M×N array. Individual image sensors 14 may be arranged in a corresponding M×N image sensor array (as an example). The values of M and N may each be equal to or greater than one, may each be equal to or greater than two, may exceed 10, or may have any other suitable values.

Each image sensor in camera module 12 may be identical or there may be different types of image sensors in a given image sensor array integrated circuit. Each image sensor may be a Video Graphics Array (VGA) sensor with a resolution of 480×640 image sensor pixels (as an example). Other arrangements of image sensor pixels may also be used for the image sensors if desired. For example, images sensors with greater than VGA resolution (e.g., high-definition image sensors), less than VGA resolution and/or image sensor arrays in which the image sensors are not all identical may be used.

During image capture operations, each lens may focus light onto an associated image sensor 14. Image sensor 14 may include photosensitive elements (i.e., pixels) that convert the light into digital data. Image sensor 14 may also include bias circuitry (e.g., source follower load circuits), sample and hold circuitry, correlated double sampling (CDS) circuitry, amplifier circuitry, analog-to-digital (ADC) converter circuitry, data output circuitry, memory (e.g., buffer circuitry), address circuitry, etc.

Still and video image data from camera sensor 14 may be provided to image processing circuitry 16 via path 26. Image processing circuitry 16 may be used to perform image processing functions such as data formatting, adjusting white balance and exposure, implementing video image stabilization, face detection, etc. Processing circuitry 16 may also be used to compress raw camera image files if desired (e.g., to Joint Photographic Experts Group or JPEG format). In a typical arrangement, which is sometimes referred to as a system on chip (SOC) arrangement, camera sensor 14 and image processing circuitry 16 are implemented on a common semiconductor substrate (e.g., a common silicon image sensor integrated circuit die). If desired, camera sensor 14 and image processing circuitry 16 may be formed on separate semiconductor substrates. For example, camera sensor 14 and image processing circuitry 16 may be formed on separate substrates that are stacked.

Imaging system 10 (e.g., processing circuitry 16) may convey acquired image data to host subsystem 20 over path 18. Host subsystem 20 may include an active control system that delivers control signals for controlling vehicle functions such as braking or steering to external devices. Host subsystem 20 may include processing software for detecting objects in images, detecting motion of objects between image frames, determining distances to objects in images, filtering or otherwise processing images provided by imaging system 10. Host subsystem 20 may include a warning system configured to disable imaging system 10 and/or generate a warning (e.g., a warning light on an automobile dashboard, an audible warning or other warning) in the event that verification circuitry associated with an image sensor indicates that the image sensor is not functioning properly or that leakage current in the image sensor is above a predetermined value.

If desired, system 100 may provide a user with numerous high-level functions. In a computer or advanced cellular telephone, for example, a user may be provided with the ability to run user applications. To implement these functions, host subsystem 20 of system 100 may have input-output devices 22 and storage and processing circuitry 24. Input-output devices 22 may include keypads, input-output ports, joysticks, buttons, displays, etc. Storage and processing circuitry 24 may include volatile and nonvolatile memory (e.g., random-access memory, flash memory, hard drives, solid state drives, etc.). Storage and processing circuitry 24 may also include microprocessors, microcontrollers, digital signal processors, application specific integrated circuits, etc.

Multiple integrated circuits may be included in imaging system 10 and host subsystem 20. It is well known that integrated circuit components such as transistors may draw a small amount of leakage current during, for example, a standby mode operation of an electronic device in which the transistors are turned off. For example, integrated circuit components (e.g., transistors) associated with image sensor 14, processing circuitry 16, and/or storage and processing circuitry 24 may draw a leakage current during operation of system 100 in a standby mode.

Some standby leakage current may be expected and may therefore be measured and accounted for during manufacturing. In some situations, an image sensor such as image sensor 14 may have undergone a High Temperature Operating Life (HTOL) test during manufacturing. HTOL tests are designed to determine the reliability of devices under operation at high temperature conditions over an extended period of time. During manufacturing, standby leakage current in an image sensor may be measured before and after testing such as HTOL testing. The results of such measurements may be taken into account when implementing the image sensor into an imaging system. For example, if the level of standby leakage current increases significantly after HTOL testing, the image sensor may not be implemented into an imaging system and/or may be reworked and retested. If the level of standby leakage current is substantially the same before and after HTOL testing (and if the level of standby leakage current is below a predetermined standard or reference current), the image sensor may be implemented into a system such as an imaging system and may be provided with verification circuitry configured to monitor standby leakage current levels during operation of the system.

If desired, any electronic component or integrated circuit in system 100 may be provided with verification circuitry for monitoring the level of standby leakage current. An imaging system such as imaging system 10 having verification circuitry configured to monitor the level of standby leakage in the imaging system is sometimes described herein as an example.

Figure 2:
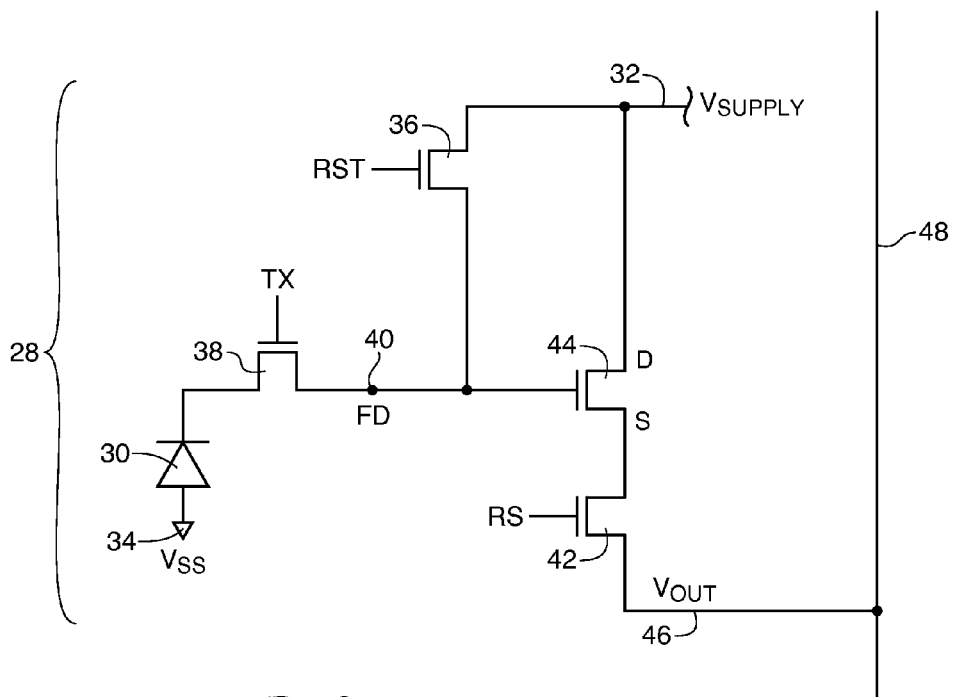
FIG. 2 is a diagram of an illustrative image sensor pixel in accordance with an embodiment of the present invention.

Circuitry in an illustrative image pixel of image sensor 14 is shown in FIG. 2. As shown in FIG. 2, pixel 28 includes a photosensitive element such as photodiode 30. A positive power supply voltage (e.g., voltage $V_{SUPPLY}$) may be supplied to positive power supply line 32. A ground power supply voltage (e.g., $V_{SS}$) may be supplied at ground terminal 34. Incoming light is collected by photodiode 30 after passing through a color filter structure. Photodiode 30 converts the light to electrical charge.

Before an image is acquired, reset control signal RST may be asserted. This turns on reset transistor 36 and resets charge storage node 40 (also referred to as floating diffusion FD) to $V_{SUPPLY}$. The reset control signal RST may then be deasserted to turn off reset transistor 36. After the reset process is complete, transfer gate control signal TX may be asserted to turn on transfer transistor (transfer gate) 38. When transfer transistor 38 is turned on, the charge that has been generated by photodiode 30 in response to incoming light is transferred to charge storage node 40.

Charge storage node 40 may be implemented using a region of doped semiconductor (e.g., a doped silicon region formed in a silicon substrate by ion implantation, impurity diffusion, or other doping techniques). The doped semiconductor region (i.e., the floating diffusion FD) exhibits a capacitance that can be used to store the charge that has been transferred from photodiode 30. The signal associated with the stored charge on node 40 is conveyed to row select transistor 42 by source-follower transistor 44.

When it is desired to read out the value of the stored charge (i.e., the value of the stored charge that is represented by the signal at the source S of transistor 44), row select control signal RS can be asserted. When signal RS is asserted, transistor 42 turns on and a corresponding signal $V_{OUT}$ that is representative of the magnitude of the charge on charge storage node 40 is produced on output path 46. In a typical configuration, there are numerous rows and columns of pixels such as pixel 28 in the image sensor pixel array of a given image sensor. A vertical conductive path such as path 48 may be associated with each column of pixels.

When signal RS is asserted in a given row, path 48 can be used to route signal $V_{OUT}$ from that row to readout circuitry. If desired, other types of image pixel circuitry may be used to implement the image pixels of sensor 14. For example, image pixels in image sensor 14 may be three-transistor pixels, pin-photodiode pixels with four transistors each, global shutter pixels, time-of-flight pixels, etc. The circuitry of FIG. 2 is merely illustrative.

In a standby mode of operation, leakage current may flow through power supply lines such as power supply line 32 of FIG. 2. In order to monitor leakage current flowing through power supply line 32, power supply line 32 may be provided with verification circuitry coupled between circuitry such as pixel 28 and a power supply pad (sometimes referred to as an input pin) that supplies voltage $V_{SUPPLY}$ to pixel 28. Verification circuitry may be configured to monitor leakage current flowing through supply line 32 and through, for example, transistors of pixel 28. A power supply line such as supply line 32 may be configured to supply multiple supply voltages to circuitry such as pixel 28 (e.g., by switchably coupling power supply line 32 to multiple power supply pads or by coupling power supply line 32 to a variable voltage supply source). Supply voltages supplied by voltage supply line 32 may include pixel bias voltage $V_{AAPIX}$ (e.g., a bias voltage for pixels 28).

Figure 3:
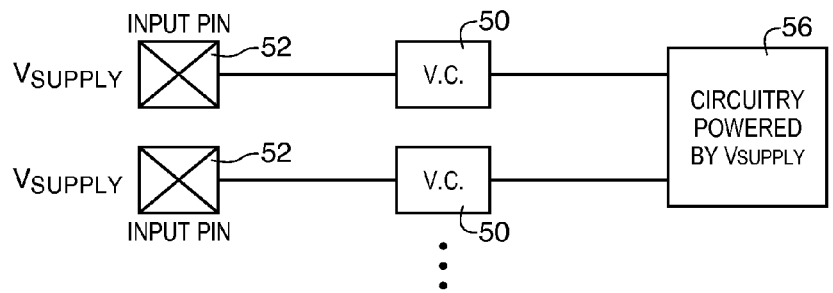
FIG. 3 is a diagram of an illustrative verification system that may be used to monitor leakage current in a plurality of current paths in accordance with an embodiment of the present invention

If desired, one or more power supply lines associated with imaging system 10 or host subsystems 20 may be provided with verification circuitry for monitoring leakage current, as shown in FIG. 3. As examples, verification circuitry for monitoring leakage current may be coupled to an input pin that supplies a digital power supply voltage $V_{DD}$ to image sensor 14, to an input pin that supplies a digital power supply input-output voltage $V_{DDIO}$ to input-output circuitry in image sensor 14, or along any power supply line associated with an electronic device or imaging system such as imaging system 10.

As shown in FIG. 3, input pins (power supply pads) such as input pins 52 of a power supply source may supply a voltage $V_{SUPPLY}$ to circuitry 56 that is powered by $V_{SUPPLY}$. $V_{SUPPLY}$ may be a pixel bias voltage such as $V_{AAPIX}$, a power supply voltage $V_{AA}$, a digital power supply voltage $V_{DD}$, a digital power supply input-output voltage $V_{DDIO}$, or other suitable supply voltage. Verification circuitry such as verification circuitry 50 (V.C.) may be coupled between each power supply 52 and circuitry 56 that is powered by that power supply. Verification circuitry 50 may be configured to determine whether or not circuitry 56 is damaged. For example, verification circuitry 50 may be configured to measure the current that is drawn by circuitry 56 during standby mode and to compare the measured standby current with a threshold current.

For clarity, only two power supply lines with verification circuitry are shown in FIG. 3. However, several or all power supply lines in image sensor 14 may be provided with verification circuitry configured to monitor standby leakage current levels in those power supply lines. If desired, multiple power supply lines may be coupled to common verification circuitry 50 and/or a common power supply source. The arrangement of FIG. 3 is merely illustrative.

Figure 4:
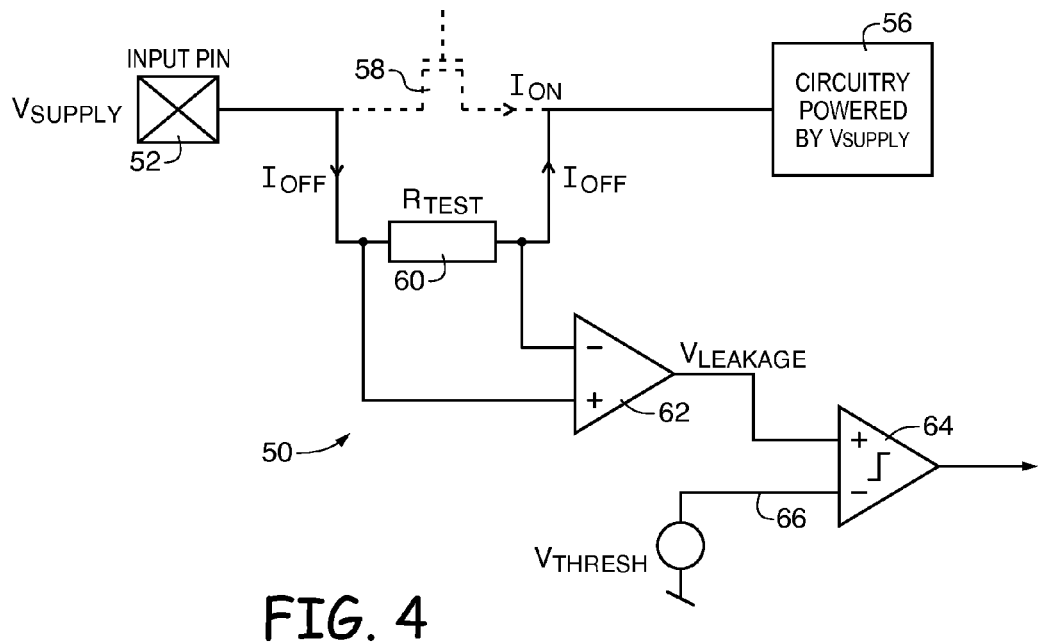
FIG. 4 is a diagram of illustrative verification circuitry that may be used in a verification system of the type shown in FIG. 3 in accordance with an embodiment of the present invention.

FIG. 4 is a diagram of illustrative circuitry that may be used in implementing verification circuitry 50. As shown in FIG. 4, verification circuitry 50 may include a power switch such as power supply switch 58 coupled between power supply 52 and circuitry 56 (circuitry that is powered by power supply 52). A resistor such as test resistor 60 may be placed in parallel with power supply switch 58. Resistor 60 may have a small resistance $R_{TEST}$ and may be used to measure any leakage current $I_{OFF}$ that flows through resistor 60 during standby mode.

When image sensor 14 is powered on (e.g., when image sensor 14 is in image capture mode), power supply switch 58 may be turned on (closed) and power supply 52 may supply a dedicated current $I_{ON}$ to circuitry 56. When image sensor 14 is powered off (e.g., when image sensor 14 is in standby mode), power supply switch 58 may be turned off (open) and resistor 60 may consequently be coupled in series between power supply 52 and circuitry 56. Any current $I_{OFF}$ that is drawn by circuitry 56 during standby mode is leakage current and will pass across resistor 60.

An amplifier such as differential amplifier 62 may be used to measure the voltage drop across resistor 60. As shown in FIG. 4, amplifier 62 may have first and second inputs terminals coupled respectively to first and second terminals of resistor 60. Amplifier 62 may be operable to generate at its output a signal $V_{LEAKAGE}$ that is proportional to, for example, the difference between the voltage at its first input terminal and the voltage at its second input terminal. The output signal $V_{LEAKAGE}$ may be routed to a comparator such as comparator 64.

Comparator 64 may have first and second input terminals. The first (positive) input terminal of comparator 64 may be coupled to the output of amplifier 62 to receive signal $V_{LEAKAGE}$. The second (negative) input terminal of comparator 64 may be provided with a predetermined threshold voltage $V_{THRESH}$ through line 66. Voltage $V_{THRESH}$ may correspond to a predetermined maximum level of acceptable standby leakage current. For example, if the maximum level of acceptable standby leakage current corresponds to a voltage of 1.0 volts, then $V_{THRESH}$ will be set to 1.0 volts.

The maximum level of acceptable standby leakage current in image sensor 14 may be based on measured standby leakage current levels in image sensor 14 during manufacturing (e.g., after HTOL testing) and/or may be based on the requirements of system 100 in which image sensor 14 is implemented.

Comparator 64 may be configured to compare a measured leakage signal such as $V_{LEAKAGE}$ with a maximum acceptable leakage signal such as $V_{THRESH}$. If $V_{LEAKAGE}$ is out of an acceptable range (e.g., if $V_{LEAKAGE}$ exceeds $V_{THRESH}$), comparator 64 may generate an output signal. The output signal from comparator 64 may include a fault or warning signal. The fault or warning signal may be conveyed to external circuitry such as processing circuitry in host subsystem 20. If desired, host subsystem 20 may be configured to issue a warning to the operator of system 100 (e.g., issue a warning to the driver of an automobile that uses system 100).

Figure 5:
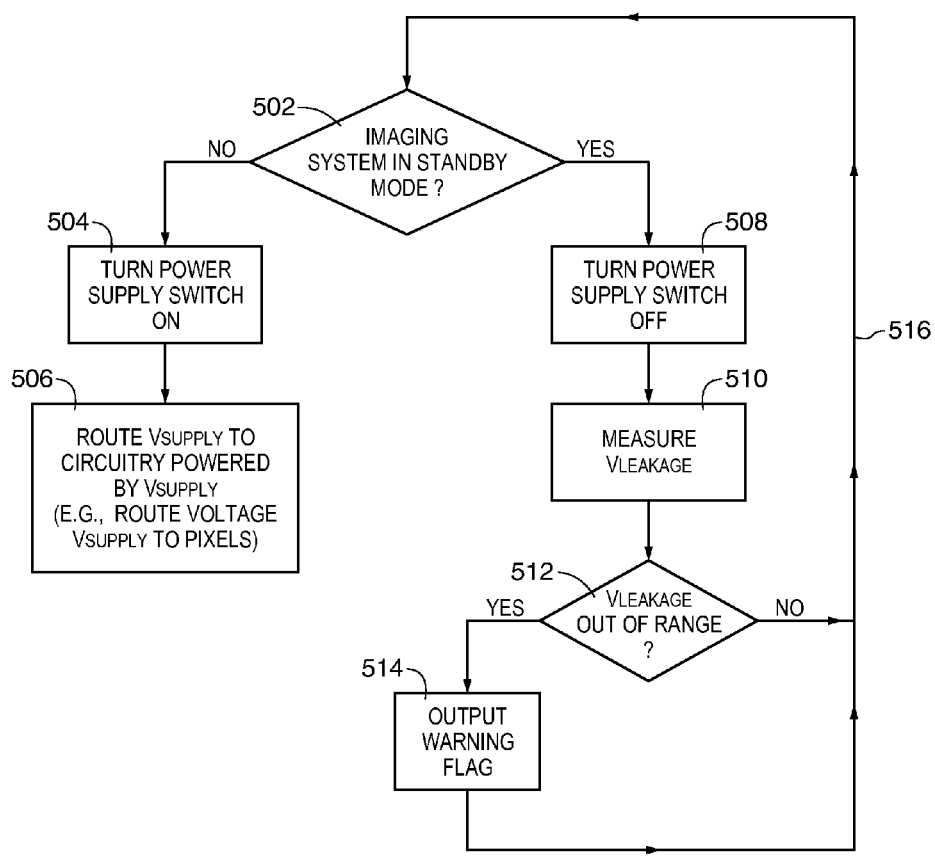
FIG. 5 is a flowchart of illustrative steps that may be used in monitoring leakage current using verification circuitry of the type shown in FIG. 4 in accordance with an embodiment of the present invention.

FIG. 5 is a flowchart showing illustrative steps that may be used in operating a system that includes an image sensor with self-verification capabilities such as image sensor 14 of FIG. 1.

At step 502, circuitry such as processing circuitry 16 may determine whether imaging system 10 is in standby mode. If it is determined that imaging system 10 is not in standby mode (e.g., if imaging system 10 is in image capture mode), imaging system 10 may proceed to step 504.

At step 504, a power supply switch such as power supply switch 58 may be turned on.

At step 506, power supply 52 may route a dedicated voltage signal such as voltage $V_{SUPPLY}$ to circuitry 56 that is powered by $V_{SUPPLY}$. For example, power supply 52 may route voltage $V_{SUPPLY}$ to pixels 28 (FIG. 2) during image capture operations.

If it is determined at step 502 that imaging system 10 is in standby mode, imaging system 10 may proceed to step 508.

At step 508, power supply switch 58 may be turned off. Any current that is drawn by circuitry such as circuitry 56 (e.g., leakage current) may then pass through leakage current monitoring circuitry such as resistor 60.

At step 510, verification circuitry may be used to measure a leakage signal $V_{LEAKAGE}$. Signal $V_{LEAKAGE}$ may, for example, correspond to a voltage drop across resistor 60. Signal $V_{LEAKAGE}$ may be conveyed to a comparator such as comparator 64.

At step 512, comparator 64 may determine whether $V_{LEAKAGE}$ is within an acceptable range of a predetermined acceptable leakage (e.g., $V_{THRESH}$). For example, comparator 64 may be configured to determine whether $V_{LEAKAGE}$ is greater than $V_{THRESH}$. If it is determined that $V_{LEAKAGE}$ does not exceed $V_{THRESH}$, system 100 may return to step 502 (as indicated by line 516) and may resume the cycle of image capture and imaging system verification while system 100 continues to operate. If it is determined that $V_{LEAKAGE}$ exceeds $V_{THRESH}$, system 100 may progress to step 514.

At optional step 514, imaging system 10 may generate a fault signal such as a warning flag and may convey the warning flag to host subsystem 20. If desired, host subsystem 20 may generate a warning such as an audible or visual alert signal for an operator of system 100 (e.g., an operator of a vehicle including a vehicle safety system such as system 100 may receive an alert signal). In some arrangements, imaging system 10 may remain in operation but an indicator may be presented to the operator to inform the operator that the imaging system needs further inspection and/or repair (e.g., the imaging system may present a "check imaging system" indication when the results of verification operations indicate a potential problem in the operation of the imaging system).

Various embodiments have been described illustrating an imaging and response system (see, e.g., system 100 of FIG. 1) including an imaging system and host subsystems. An imaging system may include one or more image sensors. Each image sensor may include an array of image pixels formed on a semiconductor substrate. Each image pixel may include one or more photosensitive elements configured to convert incoming light into electric charges.

Integrated circuit components in the image sensor and/or in other parts of the imaging and response system may draw a leakage current during a standby mode of operation of the imaging and response system. For example, a pixel's power supply line may draw a leakage current from its power source when the image sensor is in standby mode. Verification circuitry may be provided to monitor leakage current levels on some or all of the power supply lines in the image sensor. The verification circuitry may be configured to generate a warning flag if the standby leakage current level exceeds a maximum acceptable standby leakage current level.

Verification circuitry may be coupled between a power supply and circuitry that is powered by that power supply. Verification circuitry may include a power supply switch. The power supply switch may be turned on when the imaging system is in image capture mode and may be turned off when the imaging system is in standby mode. A test resistor may be placed in parallel with the power supply switch, such that when the power supply switch is turned off, the resistor is coupled in series between the power supply and the circuitry powered by that power supply. A differential amplifier may be used to measure a voltage drop across the resistor during standby mode and may be configured to generate a corresponding signal $V_{LEAKAGE}$ at its output. A comparator may then be used to determine if the measured leakage $V_{LEAKAGE}$ is within an acceptable range of a threshold leakage $V_{THRESH}$. If it is determined, for example, that $V_{LEAKAGE}$ exceeds $V_{THRESH}$, a warning signal may be generated and, if desired, an audible or visual alert may be presented to the operator of the imaging and response system.

The foregoing is merely illustrative of the principles of this invention which can be practiced in other embodiments.

What is claimed is:

1. An image sensor having an image capture mode and a standby mode comprising:
    a power supply;
    image sensor circuitry operable to receive at least one supply voltage signal from the power supply;
    verification circuitry coupled between the power supply and the image sensor circuitry, wherein the verification circuitry is operable to measure a level of leakage current drawn by the image sensor circuitry when the image sensor is in the standby mode.

2. The image sensor defined in claim 1 wherein the verification circuitry comprises:
    a power supply switch coupled between the power supply and the image sensor circuitry, wherein the power supply switch is operable to be turned on during image the capture mode and is operable to be turned off during the standby mode.

3. The image sensor defined in claim 2 wherein the verification circuitry further comprises:
    a resistor in parallel with the power supply switch, wherein the resistor has first and second terminals.

4. The image sensor defined in claim 3 wherein the verification circuitry further comprises:
    a differential amplifier having first and second input terminals coupled respectively to first and second terminals of the resistor.

5. The image sensor defined in claim 4 wherein the differential amplifier has an output terminal and is operable to generate at its output terminal a leakage voltage that is proportional to the level of standby leakage current drawn by the image sensor circuitry when the image sensor is in the standby mode.

6. The image sensor defined in claim 5 wherein the verification circuitry further comprises:
    a comparator having first and second input terminals, wherein the first input terminal is coupled to the output terminal of the differential amplifier and is operable to receive the leakage voltage, wherein the second input terminal is operable to receive a threshold voltage, and wherein the comparator is operable to determine if the leakage voltage exceeds the threshold voltage.

7. The image sensor defined in claim 1 wherein the image sensor circuitry comprises an image pixel and wherein the image pixel is operable to receive a supply voltage signal from the power supply.

8. A method, comprising:
at a first time, operating an imaging system in an image capture mode;
at a second time, operating the imaging system in a standby mode, wherein the imaging system comprises a power supply, image sensor circuitry, and verification circuitry coupled between the power supply and the image sensor circuitry; and
with the verification circuitry, measuring a level of leakage current drawn by the image sensor circuitry during the standby mode.

9. The method defined in claim 8 wherein the verification circuitry comprises a power supply switch coupled between the power supply and the image sensor circuitry, the method further comprising:
with the verification circuitry, determining that the imaging system is in the standby mode; and
with the verification circuitry, turning the power supply switch off.

10. The method defined in claim 9 wherein the verification circuitry further comprises a resistor in parallel with the power supply switch and wherein measuring the level of leakage current drawn by the image sensor circuitry during the standby mode comprises measuring the level of leakage current passing through the resistor during the standby mode.

11. The method defined in claim 10 wherein the verification circuitry further comprises a differential amplifier and wherein measuring the level of leakage current passing through the resistor comprises:
with the differential amplifier, measuring a voltage drop across the resistor.

12. The method defined in claim 10 wherein the verification circuitry further comprises a comparator, the method further comprising:
with the comparator, comparing the measured level of leakage current passing through the resistor during the standby mode with a maximum acceptable level of leakage current.

13. The method defined in claim 12 further comprising:
with the verification circuitry, determining that the measured level of leakage current exceeds the maximum acceptable level of leakage current; and
with the verification circuitry, generating a warning signal and conveying the warning signal to external circuitry.

14. A method, comprising:
at a first time, operating an integrated circuit in an active mode;
at a second time, operating the integrated circuit in a standby mode, wherein the integrated circuit comprises a power supply, circuitry, and verification circuitry coupled between the power supply and the circuitry; and
with the verification circuitry, measuring a level of leakage current drawn by the circuitry during the standby mode to determine whether or not the circuitry is damaged.

15. The method defined in claim 14 wherein determining whether or not the circuitry is damaged comprises determining whether or not the level of leakage current drawn by the circuitry during the standby mode exceeds a maximum acceptable level of leakage current.

16. The method defined in claim 15 wherein the verification circuitry comprises a power supply switch coupled between the power supply and the circuitry, the method further comprising:
with the verification circuitry, determining that the integrated circuit is in the standby mode; and
with the verification circuitry, turning the power supply switch off.

17. The method defined in claim 16 wherein the verification circuitry further comprises a resistor in parallel with the power supply switch and wherein measuring the level of leakage current drawn by the circuitry during the standby mode comprises measuring the level of leakage current passing through the resistor during the standby mode.

18. The method defined in claim 17 wherein the verification circuitry further comprises a differential amplifier and wherein measuring the level of leakage current passing through the resistor comprises:
with the differential amplifier, measuring a voltage drop across the resistor.

19. The method defined in claim 18 wherein the verification circuitry further comprises a comparator, the method further comprising:
with the comparator, comparing the measured level of leakage current passing through the resistor with a maximum acceptable level of leakage current.

20. The method defined in claim 19 further comprising:
with the verification circuitry, determining that the measured level of leakage current exceeds the maximum acceptable level of leakage current; and
with the verification circuitry, generating a warning signal and conveying the warning signal to external circuitry.

* * * * *